United States Patent
Kim et al.

(10) Patent No.: US 7,898,564 B2
(45) Date of Patent: Mar. 1, 2011

(54) VIDEO TELEPHONY SERVICE METHOD IN MOBILE COMMUNICATION NETWORK

(75) Inventors: Nam-Gun Kim, Seoul (KR); Hyun-Wook Kim, Gyeonggi-do (KR); Goon-don Choi, Gyeonggi-do (KR); Chang-Moon Han, Seoul (KR)

(73) Assignee: SK Telecom Co., Ltd. (KR)

( * ) Notice: Subject to any disclaimer, the term of this patent is extended or adjusted under 35 U.S.C. 154(b) by 456 days.

(21) Appl. No.: 11/577,656

(22) PCT Filed: Sep. 27, 2005

(86) PCT No.: PCT/KR2005/003203
§ 371 (c)(1),
(2), (4) Date: Jun. 2, 2008

(87) PCT Pub. No.: WO2006/043756
PCT Pub. Date: Apr. 27, 2006

(65) Prior Publication Data
US 2008/0266377 A1 Oct. 30, 2008

(30) Foreign Application Priority Data

Oct. 22, 2004 (KR) .................. 10-2004-0084766
Sep. 15, 2005 (KR) .................. 10-2005-0086049

(51) Int. Cl.
*H04N 7/14* (2006.01)
(52) U.S. Cl. ............. 348/14.02; 348/14.01; 348/14.08; 455/556.1; 455/556.2
(58) Field of Classification Search .... 348/14.01–14.16; 370/260–261, 310; 455/426.1, 556.1, 556.2
See application file for complete search history.

(56) References Cited

U.S. PATENT DOCUMENTS

| 5,966,165 A | * | 10/1999 | Eddington | ................. 348/14.01 |
| 5,999,525 A | | 12/1999 | Krishnaswamy et al. | |
| 6,148,072 A | * | 11/2000 | Huang | ........................ 379/219 |
| 6,775,255 B1 | | 8/2004 | Roy | |

FOREIGN PATENT DOCUMENTS

| JP | 07058874 A | * | 3/1995 |
| KR | 1020040056781 | | 7/2004 |
| WO | WO 2006/043756 | | 4/2006 |

* cited by examiner

*Primary Examiner* — Melur Ramakrishnaiah
(74) *Attorney, Agent, or Firm* — Baker & Hostetler, LLP

(57) ABSTRACT

The video telephony service method includes the step of the mobile communication system, which stores profile information, setting up a call between culling and called mobile communication terminals; the step of the mobile communication system transmitting the profile information of the calling mobile communication terminal to the called mobile communication terminal, as the calling mobile communication terminal transmits the profile information thereof to the mobile communication system; the step of the called mobile communication terminal consulting the profile information, and transmitting a response signal to the mobile communication system after establishing conditions for video telephony if it is determined that video telephony is possible for a received profile, and the mobile communication system transmitting the response signal to the calling mobile communication terminal; and the step of the mobile communication system establishing a communication path between the calling and called mobile communication terminals.

11 Claims, 8 Drawing Sheets

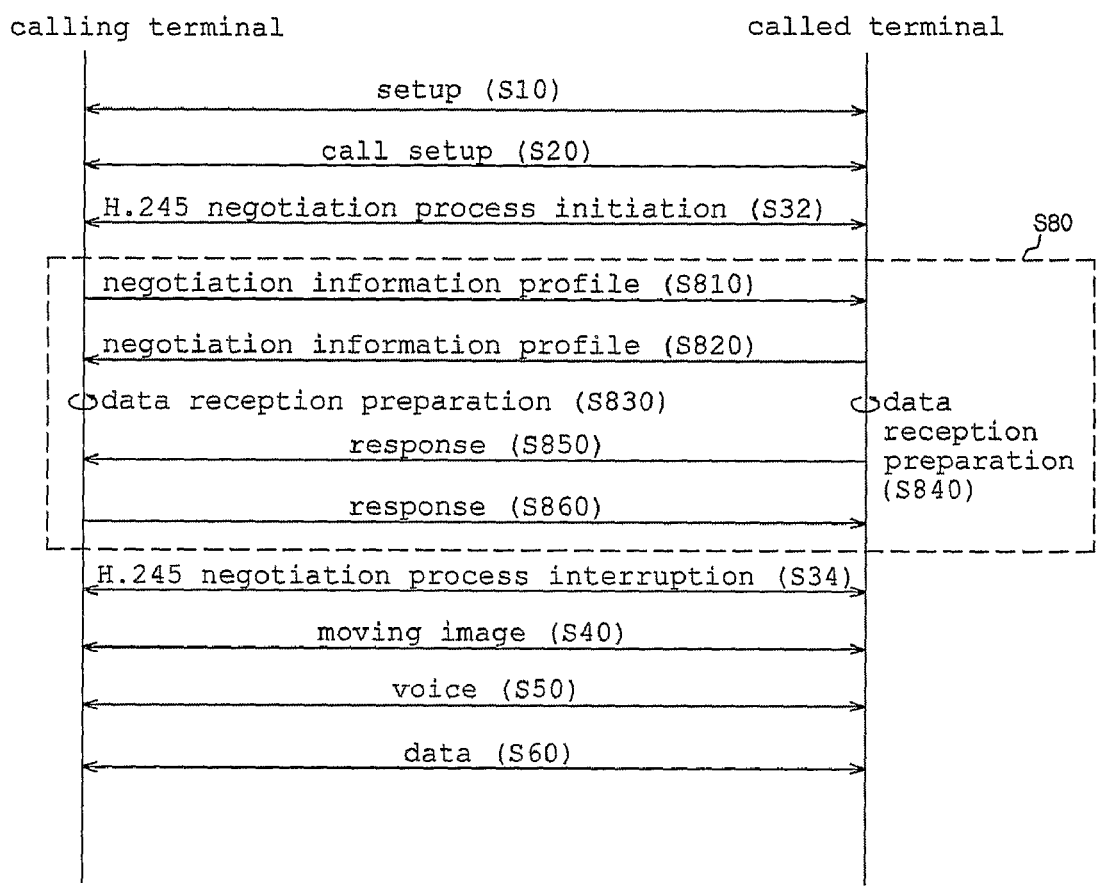

VIDEO TELEPHONY SERVICE METHOD IN MOBILE COMMUNICATION NETWORK

TECHNICAL FIELD

The present invention relates, in general, to a video telephony service method and, more particularly, to a video telephony service method in a mobile communication network for reducing a video telephony initiation time.

BACKGROUND ART

A video telephony service enables a user to communicate while viewing images of the other party through a mobile communication terminal to which a camera is attached, and can be classified into a circuit-switched method using a Mobile Switching Center (MSC) and a packet-switched method using an all-Internet Protocol (IP) network.

FIG. 1 is a block diagram showing an example of the construction of a mobile communication network for providing video telephony service.

When a video telephony call is attempted by a calling mobile communication terminal 10, a base station 12 receives the call, and performs video telephony with a called mobile communication terminal 20 through an MSC 26, a Base Station Controller (BSC) 24, and a base station 22 that are connected with the called mobile communication terminal 20 through a BSC 14 and an MSC 16. Video telephony service, as described above, is provided through the MSCs 16 and 26 in the case where the circuit-switched method is employed, and the service is provided through a General Packet Radio Service (GPRS) providing register, that is, a Serving GPRS Support Node (SGSN) 30, and a GPRS gate providing register, that is, a Gateway GPRS Support Register (GGSN), that are connected with the BSCs 14 and 24, in the case where the packet-switched method using an all-IP network is employed.

In order to provide video telephony service, an international standard protocol, for example, H.323 or H.324M, defined by International Telecommunication Union (ITU), must be implemented in a mobile communication system. H.323 is a system protocol that enables the provision of video telephony service in an IP network, that is, a packet data network, H.324 is a system protocol developed on the basis of a public network, and H.324 Mobile (M) is a system protocol that has been improved for mobile communication.

In a video telephony service using H.324M as a system protocol, the compression and encoding of moving images are performed using H.261 and H.263, and the encoding of voice is performed using G.723.1. With regard to this, H.261 is a moving image compression/encoding standard for video telephony and video conferencing, and H.263 and MPEG-4 are video compression/encoding standards that have been improved more than H.261. Furthermore, G.723.1 is a standard for converting voice signals to be less than 8 Kbps. A video standard used in 3GPP is 3G-324M, which was created by modifying H.324M to be suitable for 3GPP. 3G-324M is considerably different from H.324M in that Adaptive Multi-Rate (AMR) is basically used as a voice codec, and G.723.1 is an option.

Furthermore, H.324M uses H.223 to multiplex moving images, voice and data, and uses H.245 to allocate a point-to-point or point-to-multipoint channel by selecting a voice codec and performing a function of logical channel signaling.

FIG. 2 is a flowchart illustrating a general video telephony service method, and shows an example of using a 3G-324M protocol.

As shown in the drawing, when a calling mobile communication terminal attempts a call to use video telephony service, a setup process is performed using H.223 at step S10 and, thereafter, the call is set up at step S20.

After the call setup has been completed, a line connection and allocation process based on negotiation between calling and called mobile communication terminals using H.245 is performed at step S30. After a communication path has been established accordingly, moving images, voice, and data (picture, photograph and the like) are exchanged between the calling and called mobile communication terminals at steps S40 to S60.

FIG. 3 is a flowchart illustrating the line connection and allocation process of FIG. 2 in detail.

The line connection and allocation process is a process of exchanging information about the characteristics of mobile communication terminals and, thereby, making settings so that video telephony is made possible, in the case where voice codecs or video codecs used for the calling and called mobile communication terminals are different from each other.

As shown in the drawing, for line connection and allocation between the calling and called mobile communication terminals, a master/slave decision and response process is performed at step S310, a terminal characteristic information exchange process at S320, a multiplexing information exchange process at step S330, a logical channel generation process for voice transmission at step S340, and a logical channel generation process for video transmission at step S350.

As described above, the current negotiation process for video telephony is complicated, and a lot of time is required, so that a problem occurs in that the communication path is not established immediately after call setup, and communication is not performed, and the delay time occurs in proportion to the time for which the negotiation process is performed.

DISCLOSURE OF THE INVENTION

Accordingly, the present invention has been made keeping in mind the above problems occurring in the prior art, and an object of the present invention is to provide a video telephony service method, in which a negotiation process for video telephony is simplified, so that communication can be performed without a time delay after call setup.

Another object of the present invention is to provide a video telephony service method, which allows the transmission and reception time of data (moving images, voice, media or the like) between calling and called terminals to be clarified while quickly initiating video telephony.

BRIEF DESCRIPTION OF THE DRAWINGS

FIG. 8 is a flowchart illustrating a video telephony service method according to a fifth embodiment of the present invention.

DETAILED DESCRIPTION OF THE INVENTION

Figure 1:
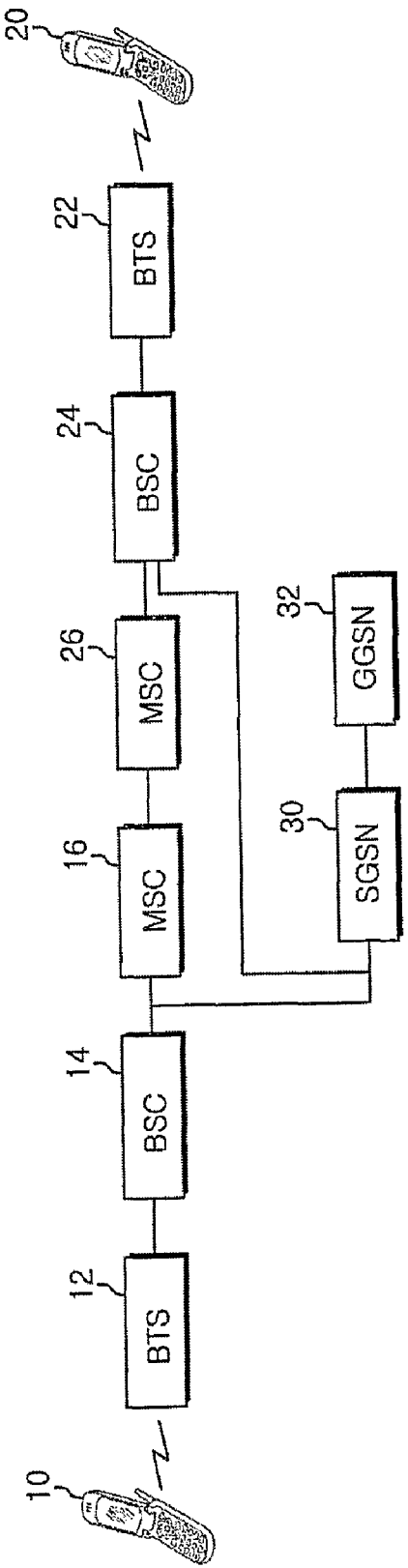
FIG. 1 is a block diagram showing an example of the construction of a mobile communication network for providing video telephony service.
Figure 2:
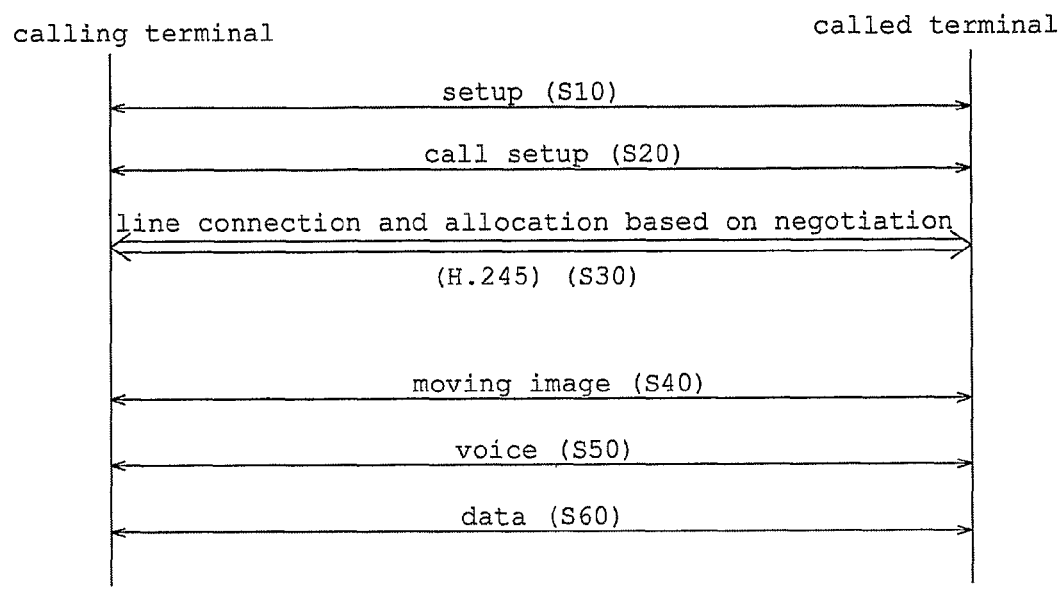
FIG. 2 is a flowchart illustrating a video telephony service method.

In order to accomplish the above object, the present invention provides a video telephony service method between mobile communication terminals, which can perform video telephony through a mobile communication system, in a mobile communication network, each of the mobile communication terminals storing profile information, the method includes the first step of the mobile communication system setting up a call between calling and called mobile communication terminals, as the calling mobile communication terminal attempts the call; the second step of the mobile communication system transmitting the profile information of the calling mobile communication terminal to the called mobile communication terminal, as the calling mobile communication terminal transmits the profile information thereof to the mobile communication system; the third step of the called mobile communication terminal consulting the profile information received from the calling mobile communication terminal, and transmitting a response signal to the mobile communication system after establishing conditions for video telephony if it is determined that video telephony is possible for a received profile, and the mobile communication system transmitting the response signal to the calling mobile communication terminal; and the fourth step of the mobile communication system establishing a communication path between the calling and called mobile communication terminals.

In addition, another embodiment of the present invention provides a video telephony service method between mobile communication terminals, each of the mobile communication terminals storing profile information, the method includes the first step of the mobile communication system setting up a call between calling and called mobile communication terminals, as the calling mobile communication terminal attempts the call; the second step of the mobile communication system transmitting the profile information of the calling mobile communication terminal to the called mobile communication terminal, as the calling mobile communication terminal transmits the profile information thereof to the mobile communication system; the third step of performing a master/slave decision and response process, a terminal characteristic information exchange process, a multiplexing information exchange process, a logical channel generation process for voice transmission, and a logical channel generation process for video transmission, thus allowing negotiation to be performed between the calling mobile communication terminal and the called mobile communication terminal, if the called mobile communication terminal does not transmit a signal in response to the profile information to the calling mobile communication terminal within a designated period; and the fourth step of the mobile communication system establishing a communication path between the calling and called mobile communication terminals.

In addition, a further embodiment of the present invention provides a video telephony service method including the first step of the mobile communication system setting up a call between calling and called mobile communication terminals, as the calling mobile communication terminal attempts the call; the second step of initiating a line connection and allocation process between the calling and called mobile communication terminals; the third step of the mobile communication system transmitting the profile information of the calling mobile communication terminal to the called mobile communication terminal, as the calling mobile communication terminal transmits the profile information thereof to the mobile communication system; the fourth step of the called mobile communication terminal consulting the profile information received from the calling mobile communication terminal, and transmitting a response signal to the mobile communication system after establishing conditions for video telephony if it is determined that video telephony is possible for a received profile, and the mobile communication system transmitting the response signal to the calling mobile communication terminal; the fifth step of interrupting the line connection and allocation process initiated at the second step; and the sixth step of the mobile communication system establishing a communication path between the calling and called mobile communication terminals.

A preferred embodiment of the present invention is described in detail with reference to the accompanying drawings below. The case of providing video telephony service using the 3G-324M protocol is described as an example below.

Since the types of a voice codec and a video codec, multiplexing information, and the type of a logical channel, which are used for video telephony in mobile communication terminals, are limited by the characteristics of the hardware of mobile communication terminals, the mobile communication terminals that enable video telephony may be classified into several types. Accordingly, the profiles for the mobile communication terminals, including the voice codec information, video codec information, multiplexing information, and logical channel information of the mobile communication terminal, may be generated in advance, and used for a negotiation process for video telephony.

This is possible because H.245, which is used to perform the negotiation process, includes a user input indication message. That is, video telephony can be immediately initiated in such a manner that profile information for video telephony is stored in each of the mobile communication terminals, a profile is transmitted to the other party's mobile communication terminal during the negotiation process for video telephony using the user input indication message, and a response is received. By doing so, video telephony can be initiated without performing a complicated negotiation process and, thereby, the time delay occurring when video telephony is performed can be minimized.

Figure 4:
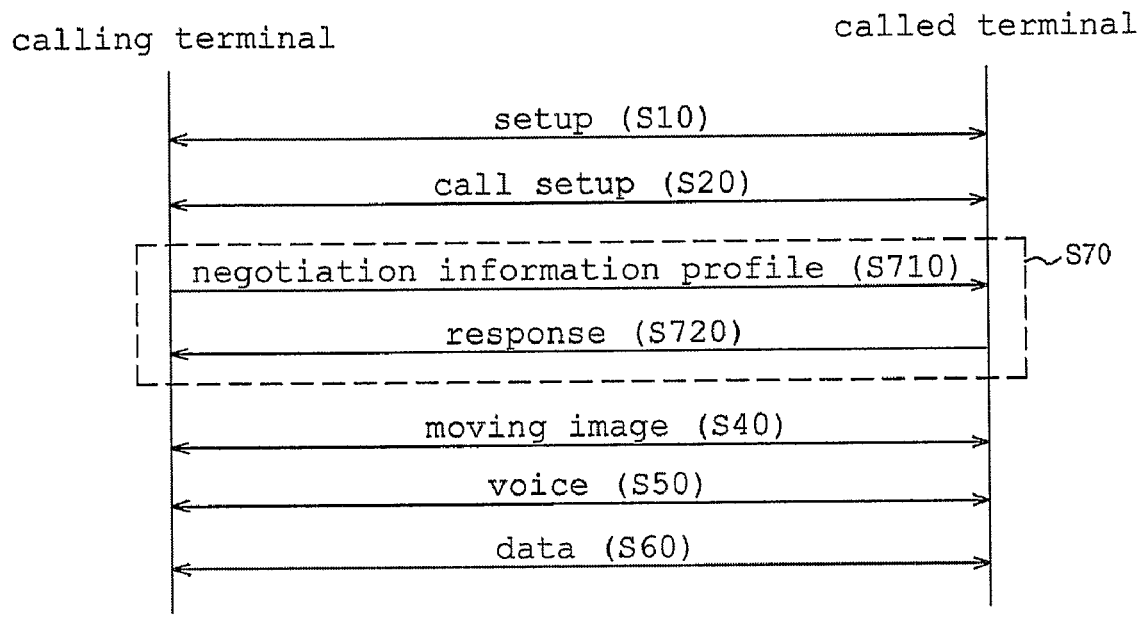
FIG. 4 is a flowchart illustrating a video telephony service method according to a first embodiment of the present invention.

FIG. 4 is a flowchart illustrating a video telephony service method according to a first embodiment of the present invention. For the present invention, mobile communication terminals, which can perform video telephony, must previously store profiles, including voice codec information, video codec information, multiplexing information, logical channel information, etc.

First, when a calling mobile communication terminal attempts a call to use video telephony service, a setup process is performed using H.223 at step S10 and, thereafter, a call is set up at step S20. After the call setup, a negotiation process is performed using H.245 at step S70.

When the calling mobile communication terminal transmits the previously stored profile information to the mobile communication system so as to perform the negotiation process of step S70, the mobile communication system transmits the profile information to the called mobile communication terminal at step S710. The called mobile communication terminal consults the profile information received from the mobile communication system, and transmits a response signal to the mobile communication system after establishing conditions for video telephony if it is determined that video telephony is possible, at step 720.

Subsequently, after a communication path has been established, moving images, voice, and data (pictures, photographs and the like) are exchanged between the calling and called mobile communication terminals at steps S40 to S60.

As described above, in the present invention, the time required from call setup to the initiation of communication can be reduced because the negotiation process is simplified. Accordingly, any inconvenience that occurred due to the user's waiting for video telephony can be solved.

Meanwhile, although each of the mobile communication terminals may use a single voice codec and a single video codec, it may use a plurality of voice codecs (for example, G.723.1 and AMR) and a plurality of video codecs (H.261, H.263 and the like). In this case, each mobile communication terminal generates a plurality of profiles for video telephony and assigns priorities thereto. Thereafter, a profile having the highest priority is transmitted to the called mobile communication terminal. If the called mobile communication terminal does not respond to the profile, the profiles are transmitted to the called mobile communication terminal in descending order of priority until the called mobile communication terminal transmits a response signal.

Figure 5:
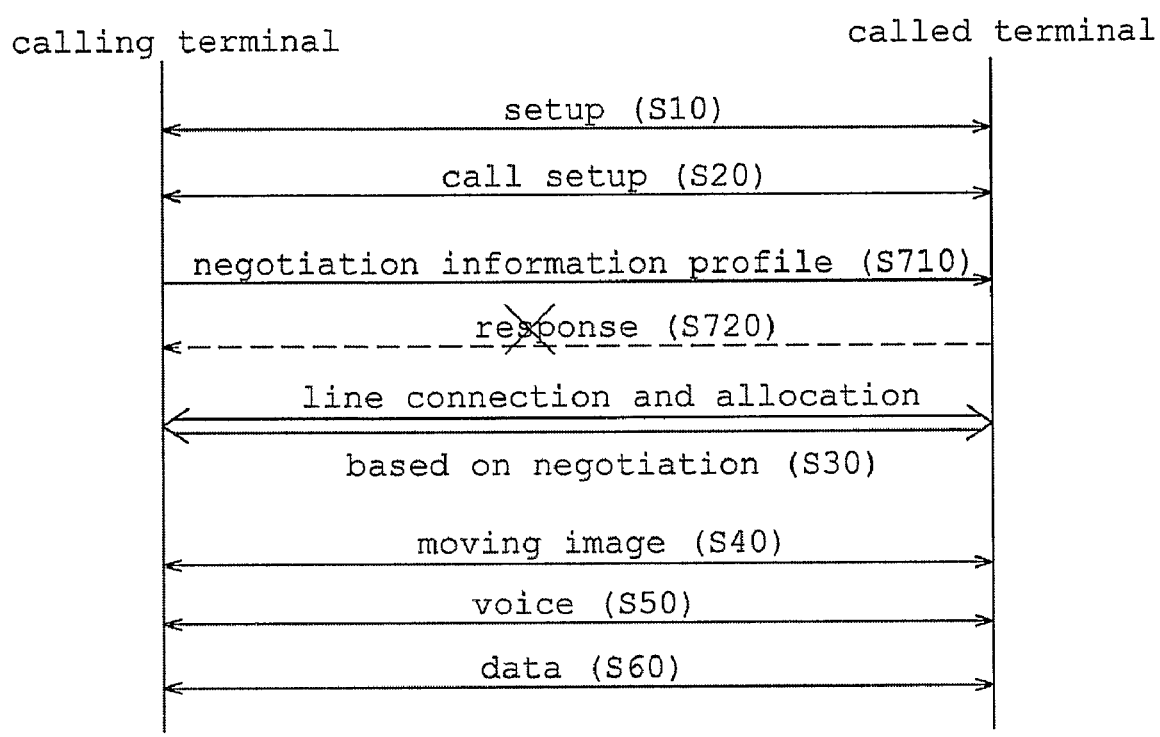
FIG. 5 is a flowchart illustrating a video telephony service method according to a second embodiment of the present invention.

FIG. 5 is a flowchart illustrating a video telephony service method according to a second embodiment of the present invention, and shows the case where a response signal from a called mobile communication terminal in response to the transmission of profile information is not received during a negotiation process according to the present invention. The present embodiment can be applied to the case where the called mobile communication terminal consults the profile information of a calling mobile communication terminal, and video telephony with the calling mobile communication terminal cannot be performed as a result of the determination of whether video telephony is possible.

First, when the calling mobile communication terminal attempts a call to use video telephony service, a setup process is performed using H.223 at step S10 and, thereafter, a call is set up at step S20. In order to perform a negotiation process using H.245 after call setup, the calling mobile communication terminal transmits previously stored profile information to the mobile communication system, and the mobile communication system transmits the profile information to the called mobile communication terminal at step S710.

Thereafter, if a response signal is not received from the called terminal within a designated period, line connection and allocation are performed based on a general negotiation process at step S30. That is, a master/slave decision and response process, a terminal characteristic information exchange process, a multiplexing information exchange process, a logical channel generation process for voice transmission, and a logical channel generation process for video transmission are performed.

After a communication path has been established, moving images, voice, and data (pictures, photographs and the like) are exchanged between the calling and called mobile communication terminals at steps S40 to S60.

Figure 6:
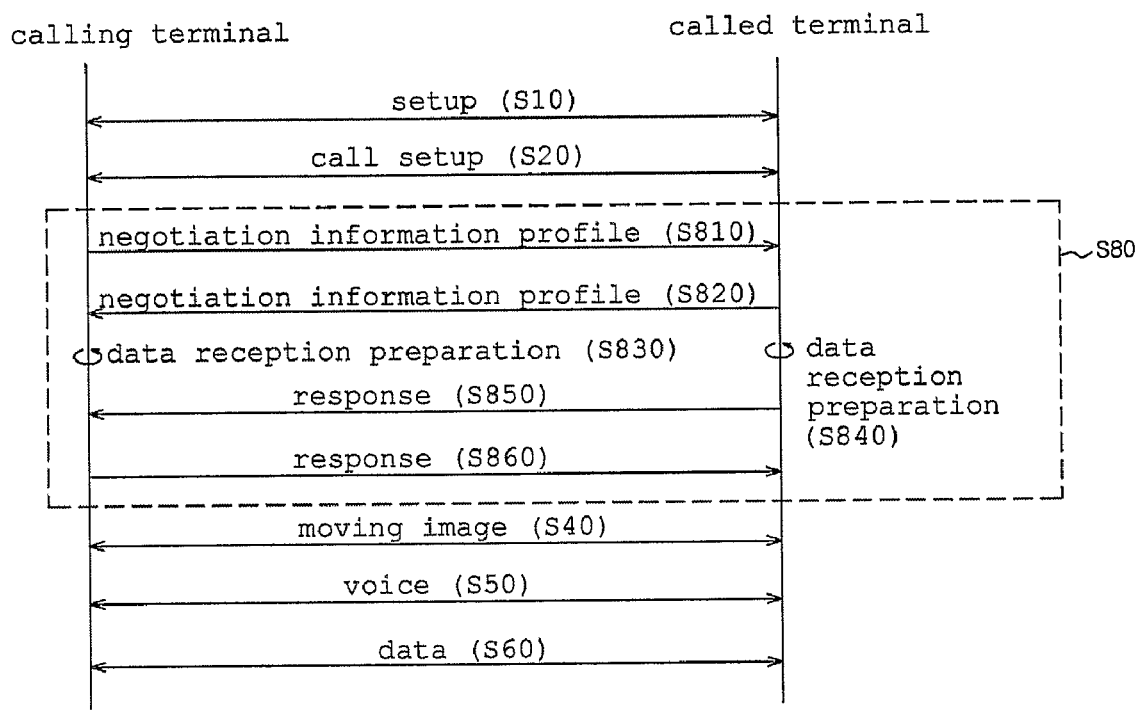
FIG. 6 is a flowchart illustrating a video telephony service method according to a third embodiment of the present invention.

FIG. 6 is a flowchart illustrating a video telephony service method according to a third embodiment of the present invention. For the present invention, mobile communication terminals, which can perform video telephony, must previously store a profile, including voice codec, video codec information, multiplexing information, logical channel information, etc.

First, when a calling mobile communication terminal attempts a call to use video telephony service, a setup process is performed using H.223 at step S10 and, thereafter, a call is set up at step S20. After call setup, a negotiation process is performed using H.245 at step S80.

When the calling mobile communication terminal first transmits the previously stored profile information thereof to the mobile communication system so as to perform the negotiation process at step S80, the mobile communication system transmits the profile information to the called mobile communication terminal at step S810. In the same manner, when the called mobile communication terminal transmits the previously stored profile information thereof to the mobile communication system, the mobile communication system transmits the profile information to the calling mobile communication terminal at step S820. The calling and called mobile communication terminals, each having received the corresponding profile information, get ready to receive data from the other party while waiting for a response from the other party at steps S830 and S840.

Thereafter, the called mobile communication terminal consults the profile information of the origination side, which is received from the mobile communication system, and transmits a response signal to the calling mobile communication terminal through the mobile communication system after establishing conditions for video telephony if it is determined that video telephony is possible, at step S850. The calling mobile communication terminal consults the profile information of the receiving side, which is received from the mobile communication system, and transmits a response signal to the called mobile communication terminal through the mobile communication system after establishing conditions for video telephony if it is determined that video telephony is possible, at step S860.

Subsequently, after a communication path has been established, moving images, voice, and data (pictures, photographs and the like) are exchanged between the calling and called mobile communication terminals at steps S40 to S60

As described above, in the present embodiment, the profile information of the calling mobile communication terminal is transmitted to the called mobile communication terminal and the profile information of the called mobile communication terminal is further transmitted to the calling mobile communication terminal, so that the time required to transmit and receive data can be clarified after the negotiation process has been successfully completed.

Furthermore, in the case where a plurality of pieces of profile information are stored in each of the mobile communication terminals, the plurality of pieces of profile information may be transmitted together or sequentially at steps S810 and S820 of transmitting negotiation information profiles, and the mobile communication terminal that receives the profile information may select an optimal profile and transmit a response signal, including information about the selected profile.

Meanwhile, although not shown in FIG. 6, in the case where a response signal is not received from either of the mobile communication terminals within a designated period after the transmission of the profile information to the called and calling mobile communication terminals, line connection and allocation are performed based on a general negotiation process. That is, a master/slave decision and response process, a terminal characteristic information exchange process, a multiplexing information exchange process, a logical channel generation process for voice transmission, and a logical channel generation process for video transmission are performed.

Figure 3:
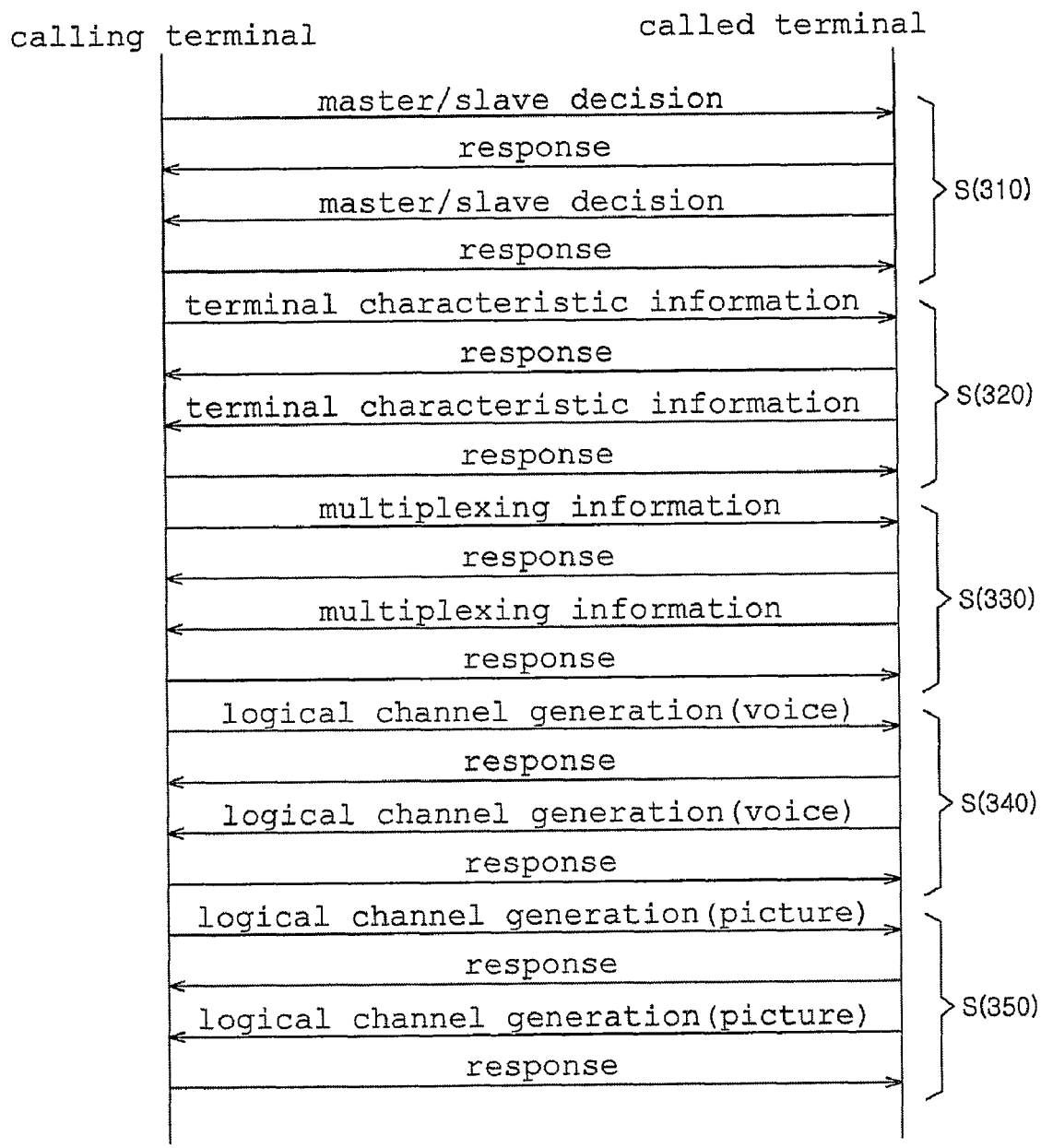
FIG. 3 is a flowchart illustrating the line connection and allocation process of FIG. 2 in detail.

In the video telephony service methods according to the first to third embodiments described above, the negotiation process can be reduced using the profile information for video telephony. However, if the negotiation process fails, the negotiation must be performed based on the general negotiation process (refer to FIG. 3), that is, the line connection and allocation process. Therefore, since the time for performing the reduced negotiation process and the time for performing the general line connection and allocation process are required, it is necessary to reduce the unnecessary time. For this purpose, a scheme of simultaneously processing the line connection and allocation process using general H.245 and the negotiation process using the profile information described in conjunction with FIGS. 1 and 3, and interrupting the line connection and allocation process using H.245 if the negotiation process using the profile information is successfully completed, can be considered.

Figure 7:
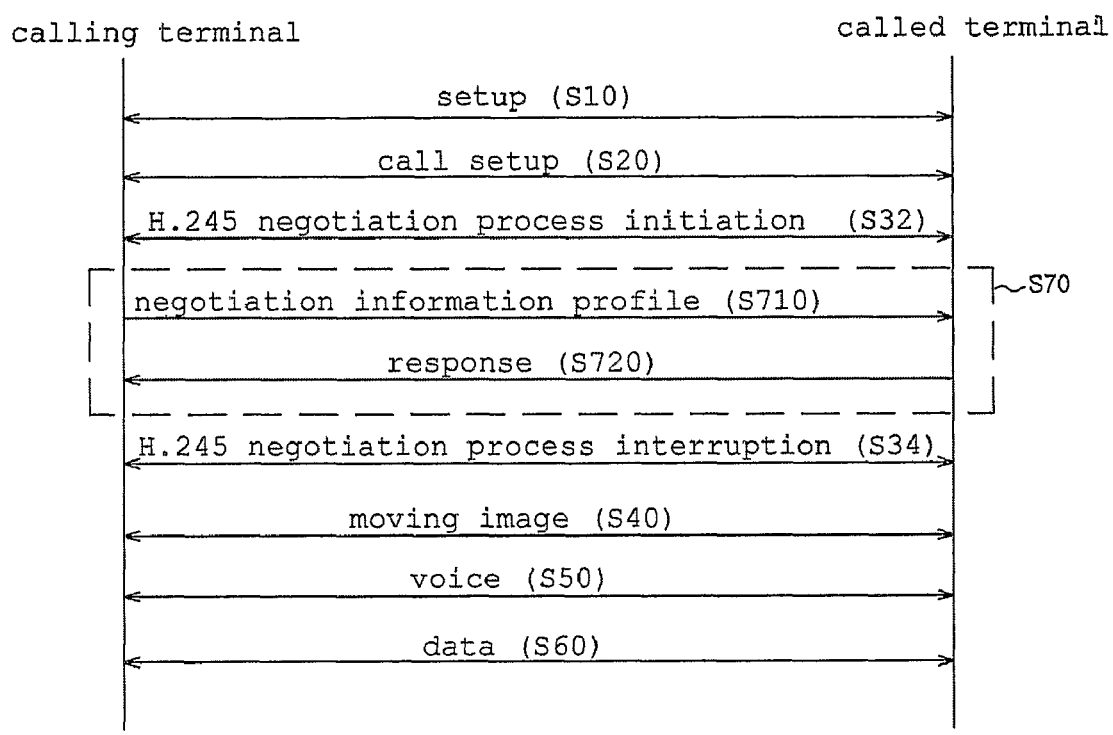
FIG. 7 is a flowchart illustrating a video telephony service method according to a fourth embodiment of the present invention.

FIG. 7 is a flowchart illustrating a video telephony service method according to a fourth embodiment of the present invention.

First, when a calling mobile communication terminal attempts a call to use video telephony service, a setup process is performed using H.223 at step S10 and, thereafter, a call is set up at step S20.

After call setup has been completed, a general H.245 negotiation process (refer to FIG. 3), that is, a line connection and allocation process is initiated at step S32. The negotiation process using profile information for video telephony and the H.245 negotiation process are performed at the same time. For this purpose, when the calling mobile communication terminal transmits the previously stored profile information to the mobile communication system, the mobile communication system transmits the received profile information to the called mobile communication terminal at step S710. Thereafter, the called mobile communication terminal consults the profile information of the calling side, which is received from the mobile communication system, and transmits a response signal to the calling mobile communication terminal through the mobile communication system after establishing conditions for video telephony if it is determined that video telephony is possible, at step S720.

As described above, since the response to the reception of the profile information is received from the called mobile communication terminal, that is, negotiation using the profile information is successfully performed, the general H.245 negotiation process, which was also being performed between calling and called mobile communication terminals, is interrupted at step S34. Thereafter, at steps S40 to S60, moving images, voice, and data (pictures, photographs and the like) are exchanged between the calling and called mobile communication terminals under the conditions negotiated at step 70.

In the case where, in the present embodiment, a plurality of pieces of profile information are stored in each of the mobile communication terminals, the plurality of pieces of profile information may be transmitted together or sequentially at the step S710 of transmitting negotiation information profile, and the mobile communication terminal that receives the profile information may select an optimal profile and transmit a response signal, including information about the selected profile.

Meanwhile, although not shown in FIG. 7, line connection and allocation are performed based on the general H.245 negotiation process described at step 32 in the case where no response signal has been transmitted from the receiving and calling mobile communication terminals within a designated period after the profile information has been transmitted to the called mobile communication terminals.

FIG. 8 is a flowchart illustrating a video telephony service method according to a fifth embodiment of the present invention.

First, when a calling mobile communication terminal attempts a call to use video telephony service, a setup process is performed using H.223 at step S10 and, thereafter, a call is set up at step S20.

After call setup has been completed, a general H.245 negotiation process (refer to FIG. 3), that is, a line connection and allocation process, is initiated at step S32. A negotiation process using profile information for video telephony and the H.245 negotiation process are performed at the same time. For this purpose, when the calling mobile communication terminal transmits the previously stored profile information to the mobile communication system, the mobile communication system transmits the received profile information to the called mobile communication terminal at step S810. In the same manner, when the called mobile communication terminal transmits the previously stored profile information thereof to the mobile communication system, the mobile communication system transmits the profile information to the calling mobile communication terminal at step S820. The calling and called mobile communication terminals, each having received the corresponding profile information, get ready to receive data from the other party while waiting for a response from the other party at steps S830 and S840.

Thereafter, the called mobile communication terminal consults the profile information of the calling side, which is received from the mobile communication system, and transmits a response signal to the calling mobile communication terminal through the mobile communication system after establishing conditions for video telephony if it is determined that video telephony is possible, at step S850. In the same manner, the calling mobile communication terminal consults the profile information of the receiving side, which is received from the mobile communication system, and transmits a response signal to the called mobile communication terminal through the mobile communication system after establishing conditions for video telephony if it is determined that video telephony is possible, at step S860.

As described above, since the response to the reception of the profile information is received from the called mobile communication terminal, that is, negotiation using the profile information is successfully performed, the general H.245 negotiation process, which was also being performed between the calling and called mobile communication terminals, is interrupted at step S34. Thereafter, at steps S40 to S60, moving images, voice, and data (pictures, photographs and the like) are exchanged between the calling and called mobile communication terminals under the conditions negotiated at step 80.

In the case where, in the present embodiment, a plurality of pieces of profile information are stored in each of the mobile communication terminals, the plurality of pieces of profile information may be transmitted together or sequentially at steps S810 and S820 of transmitting negotiation information, and the mobile communication terminal which receives the profile information may select an optimal profile and transmit a response signal, including information about the selected profile.

Meanwhile, although not shown in FIG. 8, line connection and allocation are performed through the general H.245 negotiation process described at step 32 in the case where no response signal has been transmitted from the receiving and calling mobile communication terminals within a designated period after the profile information has been transmitted to the called mobile communication terminals.

As described above, in the fourth and fifth embodiments of the present invention, both the general H.245 negotiation process and the negotiation process based on profile information are performed, and video telephony is performed using the first protocol negotiated as a result of the two negotiation processes, so that the time required to perform the general H.245 negotiation process after the negotiation process based on the exchange of the profile information has been failed can be reduced.

Meanwhile, in the present invention, for example, the parameter 'NonStandard' of the user input indication messages defined by H.245 may be used to transmit the profile information of the mobile communication terminals, and an Object IDentifier (OID) may be transmitted along with the profile information so that the type of transmitted message can be identified. The OID is composed of an object field and a data field. The object field is an information field for indicating a business name, a protocol name for video telephony, the reason for message transmission, and the type of profile information, and the detailed information about a profile corresponding to the type of profile in the object field profile is stored in the data field.

In this case, the reason why the profile information can be classified into several pieces of profile information is because the types of voice codecs and video codecs, and the types of logical channels are limited by the characteristics of the hardware of the mobile communication terminals.

Table 1 shows an example of object identifiers.

TABLE 1

| Object identifier | | |
|---|---|---|
| Object | Data | Meanings |
| 1 1 2 1 | profile 1 | SKT 3G-324M profile 1 |
| 1 1 2 2 | profile 2 | SKT 3G-324M profile 2 |
| 1 1 2 3 | profile 3 | SKT 3G-324M profile 3 |
| 1 1 3 1 | profile 1 response | SKT 3G-324M profile 1 response |
| 1 1 3 2 | profile 2 response | SKT 3G-324M profile 2 response |
| 1 1 3 3 | profile 3 response | SKT 3G-324M profile 3 response |

The following is an example of profile information in the case where AMR is used for a voice codec, and H.263 is used for a video codec.

```
* Master/slave determination
  calling terminal : Master
  called terminal : Slave
* Multiplex
  H.223 capability
  video : AL2, AL3 support
  audio : AL2 support
  NSRP support
  H.223 Annex A, B apply
  Detailed data
  videoWithAL2 TRUE,
  videoWithAL3 TRUE,
  audioWithAL2 TRUE,
  maximumAl2SDUSize 6000,
  maximumAl3SDUSize 6000,
  maximumDelayJitter 0,
  maxMUXPDUSizeCapability TRUE,
  nsrpSupport TRUE,
  mobileOperationTransmitCapability
  {
      modeChangeCapability TRUE,
      h223AnnexA TRUE,
      h223AnnexADoubleFlag TRUE,
      h223AnnexB TRUE,
      h223AnnexBwithHeader TRUE
  }
  Audio
  AMR 12.2Kbps use
  Detailed data
  capabilityIdentifier standard : { 0 0 8 245 1 1 1 },
  maxBitRate 122,
  collapsing
          parameterIdentifier standard : 0,
          parameterValue unsignedMin : 1
  }
  Video
  H.263 baseline QCIF use
  Detailed data
  qcifMPI 2,
  maxBitRate 560,
  unrestrictedVector FALSE, (Annex D)
  arithmeticCoding FALSE, (Annex E)
  advancedPrediction FALSE, (Annex F)
  pbFrames FALSE, (Annex G)
  temporalSpatialTradeOffCapability FALSE
  Multiplex table entry
  LCN1 : Audio, LCN2 : Video
```

| Table entry number | MultiplexEntryDescriptor | others |
|---|---|---|
| 1 | {LCN1, RC UCF} | |
| 2 | {LCN2, RC UCF} | |
| 3 | {LCN1, RC32}, {LCN2, RC UCF} | AMR 31 byte, Video |
| 4 | {LCN1, RC7}, {LCN2, RC UCF} | AMR 6 byte, Video |
| 5 | {LCN1, RC7}, {LCN2, RC UCF} | AMR 1 byte, Video |

Logical channels
1: Audio(AMR), AL2 use
H.223 parameter
adaptationLayerType    a12WithoutSequenceNumbers: NULL, segmentableFlag FALSE
2: Video(H.263), AL2 use
H.223 parameter
adaptationLayerType a12WithSequenceNumbers: NULL, segmentableFlag TRUE As described above, those skilled in the art to which the present invention pertains will appreciate that the present invention may be implemented in some other concrete forms without departing from the technical spirit or essential characteristics thereof. Accordingly, it should be understood that the above-described embodiments are illustrative but not restrictive. The scope of the present invention is defined by the appended claims rather than the detailed description, and it should be appreciated that the modifications that may be derived from the claims and the equivalents thereof are all included in the scope of the present invention.

INDUSTRIAL APPLICABILITY

In accordance with the present invention, a complicated negotiation process for video telephony initiation can be simplified and, therefore, the time required to initiate video telephony can be reduced, so that a delay time perceived by a user when video telephony is performed can be minimized.

Furthermore, in the case where profile information for video telephony is exchanged between calling and called mobile communication terminals, the transmission and reception time of data can be clarified, so that the video telephony initiation time can be further reduced.

Furthermore, the negotiation process and the general H.245 negotiation process based on the exchange of profile information or video telephony are simultaneously initiated, and the video telephony is performed using a protocol that is first negotiated when both negotiation processes are performed, so that the time required to perform the general H.245 negotiation process in the event of failure of the negotiation process based on the exchange of the profile information can be reduced.

The invention claimed is:

1. A video telephony service method between mobile communication terminals, which can perform video telephony through a mobile communication system, in a mobile communication network, each of the mobile communication terminals storing profile information, the method comprising:

the first step of the mobile communication system setting up a call between calling and called mobile communication terminals, as the calling mobile communication terminal attempts the call;

the second step of the mobile communication system transmitting the profile information of the calling mobile communication terminal to the called mobile communication terminal, as the calling mobile communication terminal transmits the profile information thereof to the mobile communication system;

the third step of the called mobile communication terminal consulting the profile information received from the calling mobile communication terminal, and transmitting a response signal to the mobile communication system after establishing conditions for video telephony if it is determined that video telephony is possible for a received profile, and the mobile communication system transmitting the response signal to the calling mobile communication terminal; and the fourth step of the mobile communication system establishing a communication path between the calling and called mobile communication terminals.

2. A video telephony service method between mobile communication terminals, which can perform video telephony through a mobile communication system, in a mobile communication network, each of the mobile communication terminals storing profile information, the method comprising:

the first step of the mobile communication system setting up a call between calling and called mobile communication terminals, as the calling mobile communication terminal attempts the call;

the second step of the mobile communication system transmitting the profile information of the calling mobile communication terminal to the called mobile communication terminal, as the calling mobile communication terminal transmits the profile information thereof to the mobile communication system;

the third step of performing a master/slave decision and response process, a terminal characteristic information exchange process, a multiplexing information exchange process, a logical channel generation process for voice transmission, and a logical channel generation process for video transmission, thus allowing negotiation to be performed between the calling mobile communication terminal and the called mobile communication terminal, if the called mobile communication terminal does not transmit a signal in response to the profile information to the calling mobile communication terminal within a designated period; and the fourth step of the mobile communication system establishing a communication path between the calling and called mobile communication terminals.

3. A video telephony service method between mobile communication terminals, which can perform video telephony through a mobile communication system, in a mobile communication network, each of the mobile communication terminals storing profile information, the method comprising:

the first step of the mobile communication system setting up a call between calling and called mobile communication terminals, as the calling mobile communication terminal attempts the call;

the second step of initiating a line connection and allocation process between the calling and called mobile communication terminals;

the third step of the mobile communication system transmitting the profile information of the calling mobile communication terminal to the called mobile communication terminal, as the calling mobile communication terminal transmits the profile information thereof to the mobile communication system;

the fourth step of the called mobile communication terminal consulting the profile information received from the calling mobile communication terminal, and transmitting a response signal to the mobile communication system after establishing conditions for video telephony if it is determined that video telephony is possible for a received profile, and the mobile communication system transmitting the response signal to the calling mobile communication terminal;

the fifth step of interrupting the line connection and allocation process initiated at the second step; and the sixth step of the mobile communication system establishing a communication path between the calling and called mobile communication terminals.

4. The method according to any one of claims 1 to 3, wherein the profile information for the video telephony comprises voice codec information, video codec information, multiplexing information, and logical channel information.

5. The method according to any one of claims 1 to 3, wherein the video telephony is performed using a H.324M protocol, and the profile information for the video telephony is transmitted through a user input indication message of H.245 included in the H.324M protocol.

6. The method according to any one of claims 1 to 3, wherein, when the profile information for the video telephony is transmitted, an object identifier for identifying the profile information is transmitted along with the profile information.

7. The method according to claim 6, wherein the object identifier is composed of an object field and a data field, the object field having a mobile communication business name, a video telephony protocol name, a reason for message transmission and a type of profile, and the data field having detailed information of the profile.

8. The method according to any one of claims 1 to 3, wherein the profile information for video telephony comprises a plurality of pieces of profile information, each of which has a priority, and is stored in the mobile communication terminal, and the step of the mobile communication terminal transmitting the profile information is the step of transmitting profile information having a highest priority and then transmitting the plurality of pieces of profile information in descending order of priority when the mobile communication terminal that has received the profile information does not transmit a response signal.

9. The method according to claims 1 or 2, further comprising, after the second step and before the third step, as the called mobile communication terminal transmits the profile information to the mobile communication system, the fifth step of the mobile communication system transmitting the profile information of the called mobile communication terminal to the calling mobile communication terminal, and the sixth step of the calling and called mobile communication terminals preparing for the reception of data;

after the third step and before the fourth step, the seventh step of the calling mobile communication terminal consulting the profile information received from the called mobile communication terminal, and transmitting a response signal to the mobile communication system after establishing conditions for video telephony if it is determined that video telephony is possible for a received profile, and the mobile communication system transmitting the response signal to the called mobile communication terminal.

10. The method according to claim 3, further comprising, after the third step and before the fourth step, as the called mobile communication terminal transmits the profile information to the mobile communication system, the sixth step of the mobile communication system transmitting profile information of the called mobile communication terminal to the calling mobile communication terminal, and the seventh step of the calling and called mobile communication terminals preparing for the reception of data;

after the third step and before the fourth step, the eighth step of the calling mobile communication terminal consulting the profile information received from the called mobile communication terminal, and transmitting a response signal to the mobile communication system after establishing conditions for video telephony if it is determined that video telephony is possible for a received profile, and the mobile communication system transmitting the response signal to the called mobile communication terminal.

11. The method according to claim 3, wherein the line connection and allocation process of the second step comprises a master/slave decision and response process, a terminal characteristic information exchange process, a multiplexing information exchange process, a logical channel generation process for voice transmission, and a logical channel generation process for video transmission.

* * * * *